United States Patent
Pauls

[19]

[11] Patent Number: 5,983,382
[45] Date of Patent: Nov. 9, 1999

[54] AUTOMATIC RETRANSMISSION QUERY (ARQ) WITH INNER CODE FOR GENERATING MULTIPLE PROVISIONAL DECODINGS OF A DATA PACKET

[75] Inventor: Richard Joseph Pauls, Newton, N.J.

[73] Assignee: Lucent Technologies, Inc., Murray Hill, N.J.

[21] Appl. No.: 08/775,332

[22] Filed: Dec. 31, 1996

[51] Int. Cl.⁶ .................................................. H03M 13/00
[52] U.S. Cl. ......................... 714/744; 714/703; 714/748; 714/753; 714/755; 370/260; 370/265; 370/352; 370/400; 370/402; 370/463
[58] Field of Search ......................... 371/41, 3; 370/260, 370/265, 352, 400, 402, 463; 714/748, 749, 753, 755

[56] References Cited

U.S. PATENT DOCUMENTS

| | | | |
|---|---|---|---|
| 5,410,754 | 4/1995 | Klotzbach et al. | 370/85.13 |
| 5,796,742 | 8/1998 | Klotzbach et al. | 370/466 |
| 5,799,012 | 8/1998 | Ayerst et al. | 370/336 |

FOREIGN PATENT DOCUMENTS

| | | |
|---|---|---|
| 0 771 092 A1 | 5/1997 | European Pat. Off. . |
| 0 797 327 A2 | 9/1997 | European Pat. Off. . |

OTHER PUBLICATIONS

Bernard Sklar, "Digital Communications: Fundamentals and Applications," Prentice Hall, Englewood Cliffs, New Jersey, 1988, pp. 259–260.

*Primary Examiner*—William Grant
*Assistant Examiner*—McDieunel Marc

[57] ABSTRACT

The invention discloses techniques for providing automatic retransmission query (ARQ) functions in a communication system. A transmitter in the system applies an input data packet to a first convolutional encoder operating at a first rate to generate an inner code including multiple encoded packets. The encoded packets are interleaved and applied to a second convolutional encoder operating at a second rate which generates an outer code including a transmit packet generated from each of the encoded packets. A first transmit packet is sent to a receiver, which decodes the transmit packet in a Viterbi decoder operating at the second rate to generate a decoded version of the first transmit packet. The decoded version is inverted to provide a first provisional decoding of the input packet. If a cyclic redundancy code (CRC) check of the first provisional decoding is passed, the receiver sends an ACK signal to the transmitter and no retransmission is required. If the check is not passed, the transmitter sends one or more additional transmit packets, which are processed in a manner similar to the first transmit packet to generate one or more additional provisional decodings of the input data packet. If a CRC check of a given one of these additional provisional decodings is passed, the receiver accepts it as the input packet and sends an ACK signal to the transmitter. If none pass the CRC check, the receiver may combine decoded versions of the transmit packets, and apply the result to a Viterbi decoder operating at the first rate to generate another provisional decoding of the input packet. This provisional decoding is accepted as the input packet if it passes a CRC check.

39 Claims, 3 Drawing Sheets

AUTOMATIC RETRANSMISSION QUERY (ARQ) WITH INNER CODE FOR GENERATING MULTIPLE PROVISIONAL DECODINGS OF A DATA PACKET

FIELD OF THE INVENTION

The present invention relates generally to communication systems and more particularly to automatic retransmission query (ARQ) techniques for use in directing the retransmission of data packets received with errors over a transmission channel of a communication system.

BACKGROUND OF THE INVENTION

Communication systems with automatic retransmission query (ARQ) functionality allow a receiver to indicate to a transmitter that a given data packet was received with errors and should therefore be retransmitted. ARQ techniques are also referred to as automatic repeat request techniques, and are described generally at pp. 259–260 of B. Sklar, "Digital Communications: Fundamentals and Applications," Prentice Hall, Englewood Cliffs, N.J., 1988, which is incorporated by reference herein. A conventional ARQ technique known as stop-and-wait ARQ is suitable for use with half-duplex transmission channels. In stop-and-wait ARQ, a receiver sends an acknowledge (ACK) signal to a transmitter after a given packet is received successfully. The transmitter waits until the ACK signal is received for the given packet before transmitting the next packet in a sequence of packets to be transmitted. If the receiver detects an error in a given packet, it sends a negative acknowledge (NAK) signal to the transmitter, and the transmitter then retransmits the given packet. Other ARQ techniques suitable for use with full duplex transmission channels include continuous ARQ with pullback and continuous ARQ with selective repeat. In both of these techniques, after transmitting a given packet, the transmitter continues to transmit additional packets in the packet sequence even though an ACK signal has not yet been received for the given packet. If the receiver sends a NAK signal indicating that the given packet needs to be retransmitted, a transmitter implementing continuous ARQ with pullback responds to the NAK signal by returning to the given packet in the sequence, and retransmitting the given packet and all subsequent packets which were transmitted prior to receiving the NAK signal for the given packet. A transmitter implementing continuous ARQ with selective repeat also retransmits the given packet, but then picks up in the sequence where it left off before receiving the NAK signal, such that packets following the given packet are not retransmitted unless NAK signals are also received for those packets.

These and other conventional ARQ techniques may be used in place of or in conjunction with error correction techniques such as forward error correction (FEC). ARQ techniques which are used in conjunction with FEC are referred to as hybrid ARQ techniques and include Hybrid Type I and Hybrid Type II techniques. A Hybrid Type I ARQ technique includes some amount of FEC capability in each transmitted packet, and if a retransmission of a given packet is required, retransmits the same version of the packet which was previously transmitted. An advantage of this approach is that additional circuitry for encoding and decoding different packet versions is not needed because the same version of the given packet is used for retransmission. A Hybrid Type II ARQ technique may also include some FEC capability with each packet, but retransmits a different version of a given packet if retransmission of that packet is requested. The Hybrid Type II approach provides advantages in that if the characteristics of the data packet led to the errors, the retransmitted version may not be susceptible to the same errors. Unfortunately, the flexibility of Hybrid Type I and Type II ARQ techniques is limited in that each technique requires a certain type of retransmission that may not be suitable for all applications. A system designer is generally required to select a particular one of the hybrid techniques for use under all operating conditions even though the other technique might provide superior performance under certain conditions. The current inflexibility of the available Hybrid Type I and Type II ARQ approaches may therefore lead to an excessive number of packet retransmissions and a corresponding decrease in the capacity of the communication system.

As is apparent from the above, a need exists for an improved ARQ technique which can provide the beneficial features of both conventional Hybrid Type I and Type II ARQ techniques while avoiding the above-noted problems associated with such techniques.

SUMMARY OF THE INVENTION

The present invention provides methods and apparatus for implementing automatic retransmission query (ARQ) functionality in a communication system. An ARQ technique in accordance with the invention utilizes an inner code which can provide the advantages of both Hybrid Type I and Hybrid Type II approaches in a single technique. For example, the characteristics of the inner code can be adjusted to allow the ARQ technique of the present invention to operate as a pure Hybrid Type I technique, a pure Hybrid Type II technique, or a technique combining desirable features of both Type I and Type II. In addition, combined portions of the inner code may be utilized to generate an additional provisional decoding of a given data packet without the retransmission of additional packet data. Moreover, lower layers of a communication system incorporating the present invention, such as multiplexers, packetizers, modulators, etc., do not need to be changed when the ARQ system of the present invention is altered. From the point of view of these lower layers, data packets are handled in the same manner regardless of whether the inner code is rate ½, rate ⅓, rate ¼ or any other rate. This allows the present invention to provide greater flexibility in the overall ARQ functionality of a given system while still producing packets which comply with the operating standards established for that system. These features of the present invention ensure that the most appropriate ARQ configuration can be used for a given set of operating conditions, such that the number of required packet retransmissions is reduced and the data throughput capacity of the system is significantly increased.

In accordance with one aspect of the invention, an exemplary communication system transmitter is provided. The transmitter includes a first convolutional encoder for encoding a data packet I at a first rate to generate an inner code including at least first and second encoded versions of the data packet I. For example, the first encoder may operate at a rate of ½ such that two encoded versions I1 and I2 are generated from the data packet I. The transmitter includes an interleaver for interleaving the encoded versions I1 and I2, and a second convolutional encoder for encoding I1 and I2 at a second rate to generate first and second transmit packets P1 and P2. The second encoder may operate at a rate of ⅘, such that if I1 and I2 are each 100 bits in length, the transmit packets P1 and P2 are each 125 bits in length. The transmitter further includes a processor which directs the transmission of the first transmit packet P1 to a receiver of the communication system, and the storage of the second transmit packet P2 in a transmit buffer of a transmitter memory. The stored transmit packet is retrieved and transmitted to the receiver if the receiver provides a retransmission indication to the transmitter. Other suitable operating rates for the first convolutional encoder include rate ⅓, which generates three transmit packets, rate ¼, which generates four transmit packets, and so on. The encoder rates and packet lengths may vary depending upon application-specific factors such as desired throughput data rate and the error conditions of a given transmission channel.

In accordance with another aspect of the invention, an exemplary communication system receiver is provided. The receiver includes a first Viterbi decoder operating at the above-noted second rate. The first decoder decodes a received version P1' of the first transmit packet P1 to generate a packet I1' which is inverted to provide a first provisional decoding I' of the data packet I. A cyclic redundancy code (CRC) of I' is then checked to determine if the data packet I was received with sufficient accuracy. If the check passes, I' is accepted as the packet I, and an acknowledgment (ACK) signal is sent to the transmitter. If the check does not pass, the receiver provides a retransmission indication to the transmitter, and the transmitter retrieves and transmits the second transmit packet P2. The receiver decodes a received version P2' of the transmit packet P2 in the first decoder to generate a packet I2' which is inverted to provide a second provisional decoding I" of the packet I. If a CRC check of I" passes, I" is accepted as the data packet I, and an ACK signal is sent to the transmitter. If the CRC check of I" does not pass, a receiver processor combines the packets I1' and I2' to generate a rate ½ code. The receiver includes a second Viterbi decoder operating at the first rate of ½. The second decoder decodes the rate ½ code to provide a third provisional decoding I'" of packet I. If a CRC check of I'" passes, I'" is accepted as packet I, and an ACK signal is sent to the transmitter. If it does not pass, none of the provisional decodings reproduced the input packet I with sufficient accuracy, and further retransmission requests may be generated. The number of provisional decodings in accordance with the invention may be increased by suitable adjustment of the operating rate of the first transmitter encoder and second receiver decoder. For example, if these elements operate at rate ⅓, the transmitter generates three transmit packets P1, P2 and P3, and the receiver generates four provisional decodings of a given input data packet I.

These and other features and advantages of the present invention will become more apparent from the accompanying drawings and the following detailed description.

DETAILED DESCRIPTION OF THE INVENTION

The present invention will be illustrated below in conjunction with an exemplary transmitter and receiver of a communication system. It should be understood, however, that the invention is not limited to use with any particular type of communication system, but is instead more generally applicable to any system in which it is desirable to provide ARQ functionality for data carried over a transmission channel. For example, although the techniques are particularly well-suited for use with transmissions over error-prone channels such as the IS-95 personal communications service (PCS) and cellular code division multiple access (CDMA) systems, the invention may be utilized with numerous other types of communication systems. In addition, the convolutional encoding and decoding rates, packet lengths and other system parameters described herein are by way of example only, and should not be construed as limiting the invention to any particular embodiment or class of embodiments. The term "packet" as used herein refers generally to any grouping of information bits used in a given communication system. The term "ARQ" refers generally to any technique in which a receiver provides a retransmission indication to a transmitter to indicate that a given packet was received in error and should be retransmitted in a suitable format. A "retransmission indication" as the term is used herein is intended to include not only negative acknowledgments or other signals sent from a receiver to a transmitter, but also other indications of the need for retransmission. For example, the receiver may indicate the need for retransmission by not sending an acknowledgment of a transmitted packet within a predetermined time.

Figure 1:
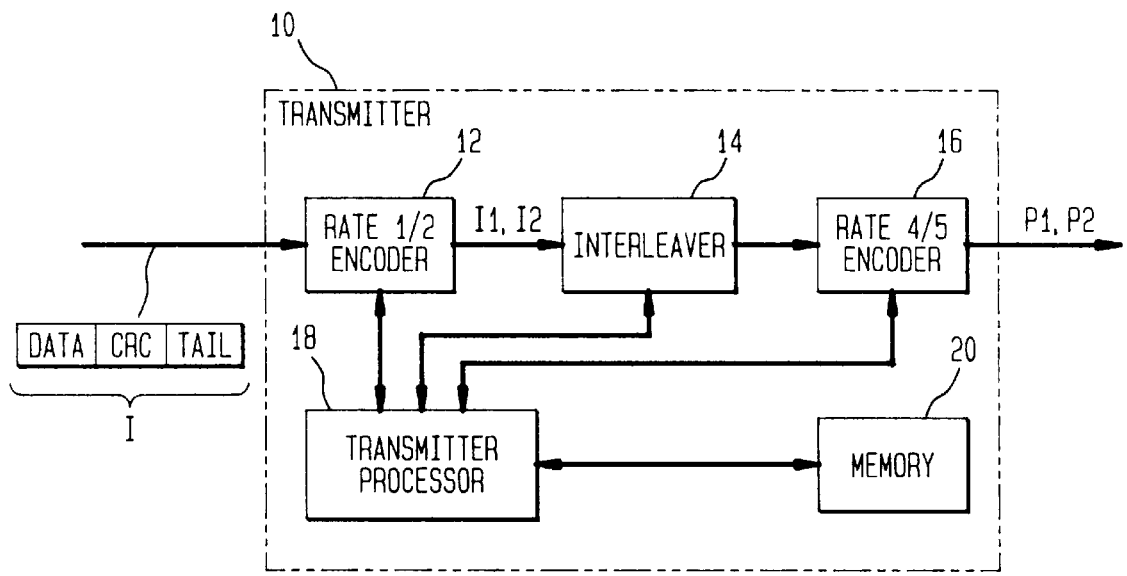
FIG. 1 shows a communication system transmitter configured in accordance with an exemplary embodiment of the invention.

FIG. 1 shows an exemplary transmitter 10 configured in accordance with the present invention. The transmitter 10 includes a rate ½ convolutional encoder 12, an interleaver 14 and a rate ⅘ convolutional encoder 16. A transmitter processor 18 operates in conjunction with a memory 20 to direct the encoding of input data packets in a manner to be described in greater detail in conjunction with FIG. 3 below. A given input data packet I having the format shown in FIG. 1 is applied to an input of the rate ½ convolutional encoder 12. The input data packet I in this embodiment includes a data portion, a cyclic redundancy code (CRC) portion, and a tail portion, and will be assumed without limitation to have a total packet length of 100 bits. The rate ½ encoder 12 generates two output bits for every input bit utilizing well-known convolutional encoding techniques. The rate ½ encoder 12 thus processes the original 100-bit input packet I to generate an inner code including a first encoded packet I1 and a second encoded packet I2, both of which are 100 bits in length. The encoded packets I1 and I2 represent different encoded versions of the original input packet I. The interleaver 14 interleaves each of the encoded packets I1 and I2, and applies the interleaved packets to an input of the rate ⅘ convolutional encoder 16. The rate ⅘ encoder 16 generates five output bits for each group of four input bits, and thus produces a pair of 125-bit transmit packets P1 and P2 corresponding to the respective 100-bit packets I1 and I2. The transmitter processor 18 directs the transmission of the first transmit packet P1 to a receiver over a transmission channel, and stores the second transmit packet P2 in a transmit buffer of memory 20 for use in subsequent retransmission, as will be described in greater detail below.

The transmit packets P1 and P2 represent an outer code in accordance with the invention. The characteristics of the outer code may remain substantially unchanged while changes are made to the inner code to adjust the features of the ARQ technique to provide pure Hybrid Type I ARQ, pure Hybrid Type II ARQ or variants of either technique. Moreover, lower layers of a communication system incorporating the present invention, such as multiplexers, packetizers, modulators, etc., do not need to be changed when the ARQ system of the present invention is altered. From the point of view of these lower layers, all of the data packets look the same and are handled in the same manner regardless of whether the inner encoder 12 is operating at rate ½, rate ⅓, rate ¼ or any other rate. This allows the present invention to provide greater flexibility in the overall ARQ functionality of a given system while still producing packets which comply with the operating standards established for that system.

The interleaving process performed in interleaver 14 will now be described in greater detail. When convolutional error correcting codes fail, they tend to produce localized bursts of errors in a decoded data sequence. Also, input data sequences containing bursts of errors are generally more difficult to correct than sequences containing an equal percentage of uniformly distributed errors. For these reasons, an interleaver such as interleaver 14 is positioned between an inner convolutional encoder such as encoder 12 and an outer convolutional encoder such as encoder 16. In a corresponding receiver, a de-interleaver spreads out bursts of errors potentially resulting from the outer convolutional decoder so that the inner convolutional decoder has a better chance of decoding the resulting sequence when multiple transmitted packets are combined. The interleaver may be implemented in memory 20 of transmitter 10, and its depth may be adjusted by a system operator to suit the characteristics of a particular channel. One such adjustment may be to use no interleaving at all, and use of such an adjustment will generally not require altering the settings of any system components other than the receiver de-interleaver. The interleaver 14 may therefore be eliminated in alternative embodiments. It should be noted that the above-described interleaving is in addition to any interleaving performed by lower layer transmission, modulation or multiplexing components of a given system.

It should be noted that the transmitter 10 is simplified to facilitate illustration of the present invention. Other transmitters incorporating ARQ functions in accordance with the present invention may apply further processing operations, such as framing, modulating, multiplexing, etc. The transmitter 10 of FIG. 1 may thus be viewed as an encoding portion of a more complex transmitter. The further processing operations required in a particular communication system application are well understood in the art and therefore will not be described in detail herein. The transmitter processor 18 of FIG. 1 may be implemented as a microprocessor, microcontroller, central processing unit (CPU) of a computer, an application-specific integrated circuit (ASIC) or other digital data processor suitably programmed to provide the functions described in conjunction with FIG. 3 below. It should be noted that in alternative embodiments, some or all of the functions provided by the encoders 12, 16 and the interleaver 14 may be incorporated into the transmitter processor 18.

Figure 2:
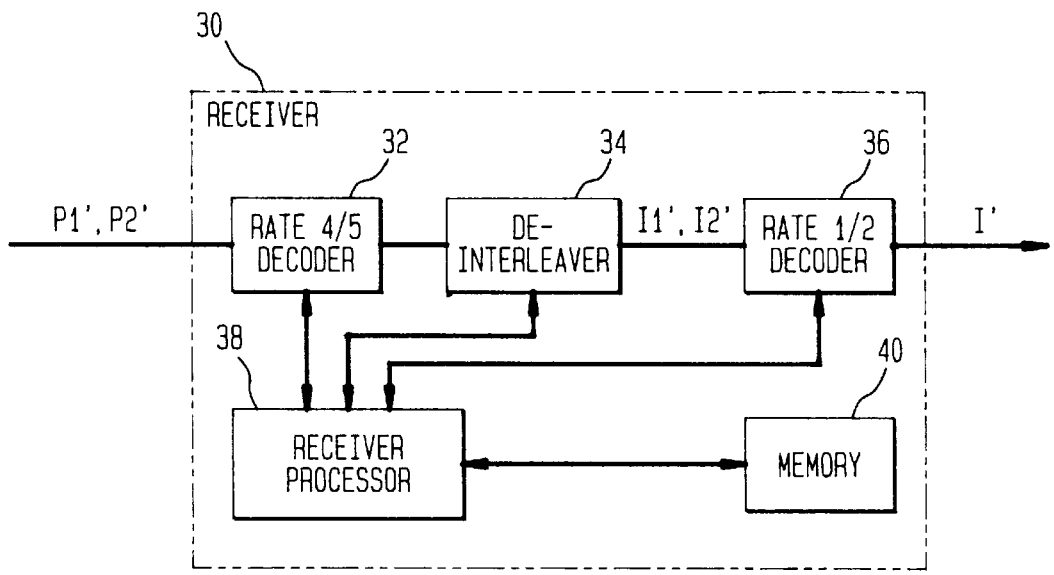
FIG. 2 shows a communication system receiver configured in accordance with an exemplary embodiment of the invention.

FIG. 2 shows an exemplary receiver 30 configured in accordance with the present invention. The receiver 30 includes a rate ⅘ decoder 32, a de-interleaver 34 and a rate ½ decoder 36. The decoders 32, 36 may be implemented as conventional Viterbi decoders. A receiver processor 38 operates in conjunction with a memory 40 to direct the decoding of received transmit data packets in a manner to be described in greater detail in conjunction with FIG. 4 below. The input packet supplied to the rate ⅘ decoder 32 may be a packet P1' corresponding to the packet P1 initially sent by transmitter 10, or a packet P2' corresponding to packet P2 which may be sent as a retransmission by transmitter 10. A given received input data packet P1' or P2' may include errors resulting from passing through the above-noted transmission channel from transmitter 10 to receiver 30. The packets P1' and P2' are each 125 bits in length in this example. The rate ⅘ decoder 32 decodes P1' or P2' to produce 100-bit packets which are de-interleaved in de-interleaver 34 to provide packets I1' or I2' corresponding to respective encoded packets I1 and I2 generated by the rate ½ encoder 12 of transmitter 10. The packets I1' and I2' may then be individually inverted to provide first and second provisional decodings I' and I" of the original input data packet I.

As will be described in greater detail in conjunction with FIG. 4 below, the receiver processor 38 performs a CRC check on the first provisional decoding I' to determine if the original data packet I has been successfully recreated from the received version P1' of the first transmit packet P1. If the CRC check of I' is not passed, the receiver provides a retransmission indication to the transmitter, and the transmitter retrieves and sends the second transmit packet P2. The rate ⅘ decoder 32 and de-interleaver 34 process the received version P2' to generate I2', and I2' is then inverted to generate the second provisional decoding I" of data packet I. The receiver processor 38 then performs a CRC check on the second provisional decoding I" to determine if the original data packet was successfully recreated from the received version P2' of the second transmit packet P2. If the CRC check of I" is not passed, the receiver 30 generates a third provisional decoding I''' of data packet I by concatenating I1' and I2' and decoding the 200-bit result in rate ½ decoder 36. The transmitter 10 and receiver 30 thus allow implementation of an ARQ technique in which multiple provisional decodings of a given data packet can be generated and checked for accuracy.

It should be noted that the receiver 30, like the transmitter 10, is simplified to facilitate illustration of the present invention, and in other embodiments may perform additional processing operations associated with conventional receivers. The receiver processor 38, like the transmitter processor 18, may be implemented as a microprocessor, microcontroller, CPU of a computer, an ASIC or other digital data processor suitably programmed to provide the functions described in conjunction with FIG. 4 below. In alternative embodiments, some or all of the functions provided by the decoders 32, 36 and the de-interleaver 34 may be incorporated into the receiver processor 38.

Figure 3:
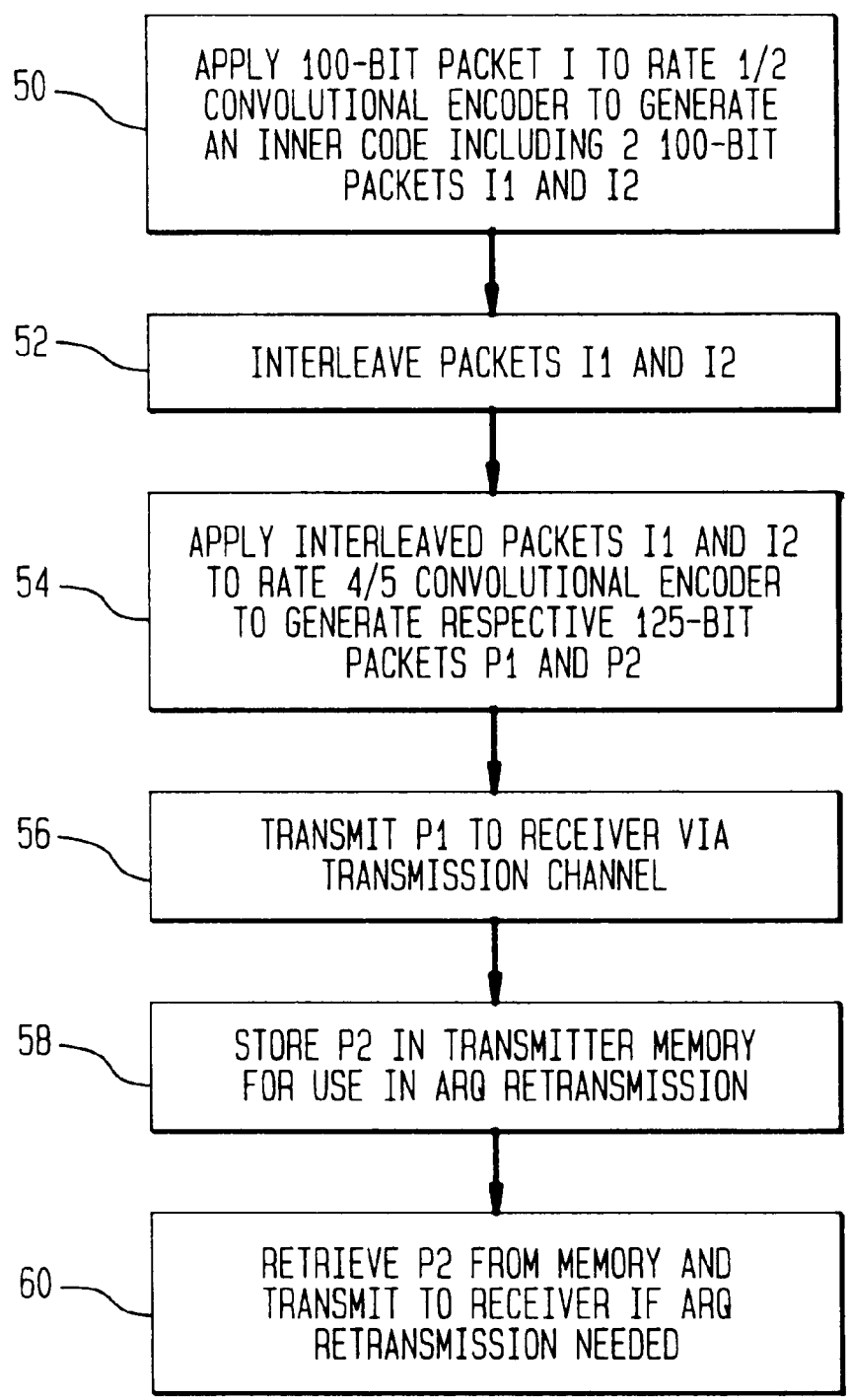
FIG. 3 is a flow diagram illustrating encoding operations performed in the transmitter of FIG. 1 in accordance with an exemplary ARQ technique of the present invention.

FIG. 3 shows an exemplary set of encoding operations performed in the transmitter 10 in accordance with the invention. As noted in step 50, an input data packet with a packet length assumed to be 100 bits is applied to rate ½ convolutional encoder 12 to thereby generate an inner code which in this example includes two 100-bit encoded packets I1 and I2. Step 52 indicates that the encoded packets I1 and I2 are interleaved using interleaver 14. The interleaved encoded packets I1 and I2 are then applied to the rate ⅘ convolutional encoder to generate 125-bit first and second transmit packets P1 and P2, as shown in step 54. Step 56 indicates that the first transmit packet P1 is transmitted to the receiver via the transmission channel. The second transmit packet P2 is stored in a transmit buffer of memory 20 for use in subsequent ARQ retransmission, as shown in step 58. If a retransmission indication is provided to the transmitter by the receiver, step 60 indicates that the second transmit packet is retrieved from the transmit buffer of memory 20 and transmitted to the receiver. As previously noted, the retransmission indication may take the form of a signal sent from the receiver to the transmitter, such as a conventional negative acknowledgment (NAK) signal, or the failure of the receiver to generate a conventional acknowledgment (ACK) signal within a predetermined period of time.

Figure 4:
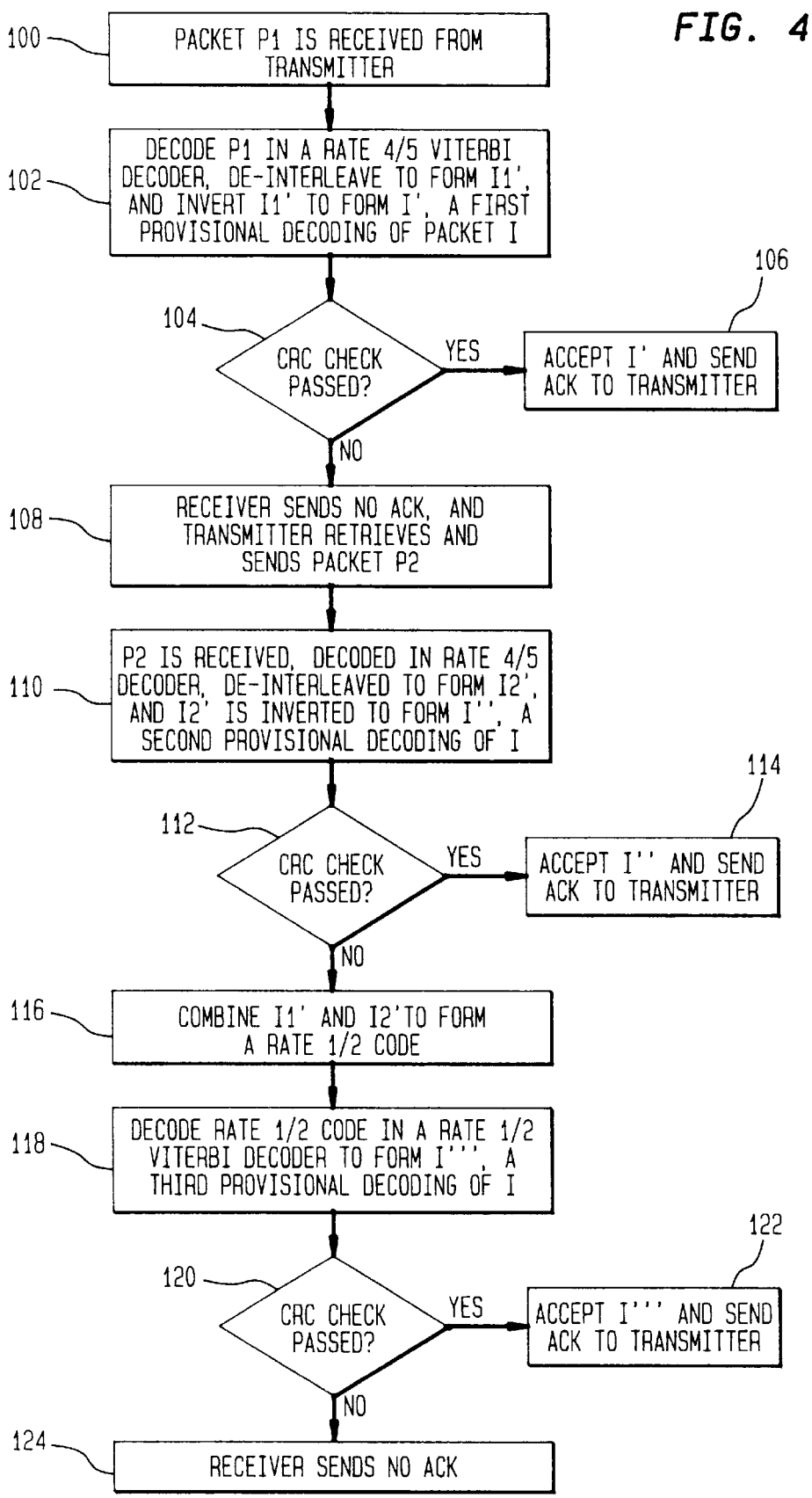
FIG. 4 is a flow diagram illustrating decoding operations performed in the receiver of FIG. 2 in accordance with an exemplary ARQ technique of the present invention.

FIG. 4 shows an exemplary set of decoding operations performed in the receiver 30 in accordance with the invention. In step 100, the first transmit packet P1 is received from the transmitter 10 over the transmission channel. Step 102 indicates that P1 is decoded in rate ⅖ Viterbi decoder 32 and then de-interleaved to form the above-noted packet I1'. I1' is then inverted to form the first provisional decoding I' of the original input packet I. In step 104, the CRC field of the first provisional decoding I' is checked for accuracy. If the CRC check of I' passes, the original input packet has been received successfully and no retransmission will be necessary. The receiver 30 therefore accepts the first provisional decoding I' as the packet I and sends a conventional ACK signal to the transmitter 10, as shown in step 106.

The above-noted inversion process will now be described in greater detail. The manner in which a given packet is inverted generally depends on the manner in which that packet was encoded. As an example, consider an inner encoder 12 operating at a rate ½. The packets I1' and I2' could then be constructed by directing the output of one code generating polynomial into the first packet and that of the other code generating polynomial into the second packet. In this case, either packet may be inverted, in the absence of errors, to recover the original sequence by performing rate 1 Viterbi decoding of the packet using the corresponding generator polynomial. Alternatively, since all that is required at this point is an indication as to whether or not the packet is error free, an additional CRC field could be used to avoid inverting each of the packets I1' and I2'. If a check of this additional CRC field fails, there is no need to perform the inversion, and a retransmission could be requested immediately.

If the CRC check of the first provisional decoding I' does not pass, step 108 indicates that the receiver 30 sends no ACK signal in order to provide a retransmission indication to the transmitter. Alternatively, the receiver could send a NAK signal in order to provide the retransmission indication. The transmitter 10 responds to the retransmission indication by retrieving the second transmit packet P2 and sending it to the receiver over the transmission channel. In step 110, the receiver 10 decodes the received version P2' of the transmit packet P2 in the rate ⅖ decoder 32, and de-interleaves the result to generate packet I2' using de-interleaver 34. The packet I2' is then inverted to form the packet I" which represents the second provisional decoding of the original data packet I. In step 112, the CRC field of the second provisional decoding I" is checked. If the CRC check of I" passes, the original input packet I has been received successfully and no further retransmission will be necessary. The receiver 30 therefore accepts the second provisional decoding I" as the packet I and sends a conventional ACK signal to the transmitter 10, as shown in step 114. If the CRC check does not pass, step 116 indicates that the receiver processor 38 combines the packets I1' and I2' to form a 200-bit rate ½ code. The manner in which the packets I1' and I2' are combined to produce the rate ½ code again depends on the manner in which the packets were encoded, as described above. If, as in the example given previously, the two packets were generated by directing the output of each generator polynomial into its own packet, the recombination of these packets could involve taking one bit from each packet in an alternating fashion until all bits are used up. In other embodiments, the combining of the packets in step 116 could involve concatenating the packets.

In step 118, the rate ½ code is decoded in rate ½ decoder 36 to form I'" which represents a third provisional decoding of the original input packet I. The CRC field of the third provisional decoding I'" is then checked in step 120. If the CRC check of I'" passes, step 122 indicates that the receiver accepts I'" as the input packet I and sends a conventional ACK signal to the transmitter. If the CRC check does not pass, the input packet I has not been accurately reconstructed by the first, second and third provisional decodings, and the receiver therefore does not send an ACK signal, as shown in step 124. As noted previously, the receiver may send a conventional NAK signal instead of not sending the ACK signal. The transmitter may respond by retransmitting the packet P1 and the receiver will then repeat the processing steps of FIG. 4.

As previously noted, alternative embodiments of the invention may utilize different packet lengths and encoding rates than those used in the above illustrative embodiment. These parameters may vary in accordance with application-specific factors such as data throughput requirements and the error conditions of the transmission channel. For example, the rate of the encoder 12 could be changed to ⅓ to provide two retransmissions, to ¼ to provide three retransmissions, and so on. Corresponding changes in the rate of decoder 36 could be provided to generate an additional provisional decoding based on concatenation of the decoded versions of the transmit packets.

An ARQ technique in accordance with the invention provides improved flexibility in that the inner code may be adjusted such that the technique operates as a pure Hybrid Type I technique, a pure Hybrid Type II technique, or a suitable combination of various aspects of both techniques, while the characteristics of the outer code may remain substantially unchanged. Moreover, various portions of the inner code may be combined and processed in the manner described in steps 116–122 of FIG. 4 to provide an additional provisional decoding of a given data packet, without the need for retransmission of additional data from the transmitter. These features of an ARQ technique of the present invention can reduce the number of required packet retransmissions and thereby increase the data throughput in a variety of communication applications.

The above-described embodiments of the invention are intended to be illustrative only. Numerous alternative embodiments may be devised by those skilled in the art without departing from the scope of the following claims.

What is claimed is:

1. A method of communicating a data packet from a transmitter to a receiver in a communication system, the method comprising the steps of:
   encoding the data packet in a first convolutional encoder having a first rate to thereby generate an inner code including at least first and second encoded versions of the data packet;
   encoding the first and second encoded versions of the data packet in a second convolutional encoder having a second rate to thereby generate first and second transmit packets;
   transmitting the first transmit packet to the receiver; and
   storing the second transmit packet for use in retransmission.

2. The method of claim 1 wherein the first and second rates are different rates.

3. The method of claim 1 wherein the step of encoding the data packet in a first convolution encoder having a first rate further includes the step of encoding the data packet in a convolution encoder having a rate of ½.

4. The method of claim 1 wherein the step of encoding the data packet in a first convolution encoder having a first rate further includes the step of encoding the data packet in a convolution encoder having a rate of ⅓.

5. The method of claim 1 wherein the step of encoding the data packet in a first convolution encoder having a first rate further includes the step of encoding the data packet in a convolution encoder having a rate of ¼.

6. The method of claim 1 wherein the step of encoding the encoded versions of the data packet in a second convolution encoder having a second rate further includes the step of encoding the data packet in a convolution encoder having rate of ⅘.

7. The method of claim 1 further including the step of interleaving the first and second encoded versions prior to the step of encoding said encoded versions in the second convolutional encoder.

8. The method of claim 1 further including the steps of:
retrieving the second transmission packet in response to a retransmission indication provided by the receiver; and
transmitting the second transmission packet to the receiver.

9. A method of processing transmit packets received from a transmitter in a communication system, the transmit packets corresponding to encoded versions of a given data packet, the method comprising the steps of:
decoding a first transmit packet in a first decoder having a first rate to thereby generate a first version of the data packet;
providing a retransmission indication to the transmitter if the first version of the data packet is not sufficiently accurate;
receiving a second transmit packet in response to the retransmission indication; and
decoding the second transmit packet in the first decoder to thereby generate a second version of the data packet.

10. The method of claim 9 wherein the step of decoding the first transmit packet in a first decoder having a first rate further includes the step of decoding the first transmit packet in a decoder having a rate of ⅘.

11. The method of claim 9 further including the steps of:
concatenating decoded versions of the first and second transmit packets to form a combined code at a second rate if the second version of the data packet is not sufficiently accurate; and
decoding the combined code in a second decoder having the second rate to thereby form a third version of the data packet.

12. The method of claim 11 wherein the second rate is different than the first rate.

13. The method of claim 11 wherein the second rate is a rate of ½.

14. The method of claim 11 wherein the second rate is a rate of ⅓.

15. The method of claim 11 wherein the second rate is a rate of ¼.

16. The method of claim 11 further including the step of providing a retransmission indication to the transmitter if the third version of the data packet is not sufficiently accurate.

17. The method of claim 9 further including the step of determining if a given version of the data packet is sufficiently accurate by performing a check of a cyclic redundancy code field of the data packet.

18. An apparatus for communicating a data packet to a receiver in a communication system, the apparatus comprising:
a first convolutional encoder for encoding the data packet at a first rate to generate an inner code including at least first and second encoded versions of the data packet;
a second convolutional encoder for encoding the first and second encoded versions of the data packet at a second rate to generate first and second transmit packets; and
a processor operative to direct the transmission of the first transmit packet to the receiver, and to direct the storage of the second transmit packet for use in retransmission.

19. The apparatus of claim 18 wherein the first and second rates are different rates.

20. The apparatus of claim 18 wherein the first rate is ½.

21. The apparatus of claim 18 wherein the first rate is ⅓.

22. The apparatus of claim 18 wherein the first rate is ¼.

23. The apparatus of claim 18 wherein the second rate is ⅘.

24. The apparatus of claim 18 further including an interleaver for interleaving the first and second encoded versions before said encoded versions are encoded in the second convolutional encoder.

25. The apparatus of claim 18 wherein the processor is further operative to direct the retrieval of the second transmit packet in response to a retransmission indication provided by the receiver, and to direct the transmission of the second transmit packet to the receiver.

26. An apparatus for processing transmit packets received from a transmitter in a communication system, the transmit packets corresponding to encoded versions of a given data packet, the apparatus comprising:
a first decoder for decoding a first transmit packet at a first rate to generate a first version of the data packet; and
a processor operative to provide a retransmission indication to the transmitter if the first version of the data packet is not sufficiently accurate, and to receive a second transmit packet in response to the retransmission indication, wherein the first decoder decodes the second transmit packet to generate a second version of the data packet.

27. The apparatus of claim 26 wherein the first rate is ⅘.

28. The apparatus of claim 26 wherein the processor is further operative to combine decoded versions of the first and second transmit packets to form a combined code at a second rate if the second version of the data packet is not sufficiently accurate.

29. The apparatus of claim 28 further including a second decoder for decoding the combined code at the second rate to form a third version of the data packet.

30. The apparatus of claim 28 wherein the second rate is ¼.

31. The apparatus of claim 28 wherein the second rate is different than the first rate.

32. The apparatus of claim 28 wherein the second rate is ½.

33. The apparatus of claim 28 wherein the second rate is ⅓.

34. The apparatus of claim 29 wherein the processor is further operative to provide a retransmission indication to the transmitter if the third version of the data packet is not sufficiently accurate.

35. The apparatus of claim 26 wherein the processor is operative to determine if a given version of the data packet is sufficiently accurate by performing a check of a cyclic redundancy code field of the data packet.

36. A communication system comprising:
a first transmitter encoder in a transmitter of said communication system for encoding a data packet at a first rate to generate an inner code including at least first and second encoded versions of the data packet;
a second transmitter encoder for encoding the first and second encoded versions of the data packet at a second rate to generate first and second transmit packets;

a transmitter processor operative to direct the transmission of the first transmit packet from the transmitter to a receiver of the communication system, and to direct the storage of the second transmit packet for use in retransmission;

a first receiver decoder for decoding the first transmit packet at a first rate to generate a first version of the data packet; and a receiver processor operative to provide a retransmission indication to the transmitter if the first version of the data packet is not sufficiently accurate, and to receive a second transmit packet in response to the retransmission indication, wherein the first decoder decodes the second transmit packet to generate a second version of the data packet.

37. The system of claim 36 wherein the transmitter processor is further operative to direct the retrieval of the second transmit packet in response to a retransmission indication provided by the receiver, and to direct the transmission of the second transmit packet to the receiver.

38. The system of claim 36 wherein the receiver processor is further operative to combine decoded versions of the first and second transmit packets to form a combined code at the second rate if the second version of the data packet is not sufficiently accurate.

39. The system of claim 38 further including a second receiver decoder for decoding the combined code at the second rate to form a third version of the data packet.

\* \* \* \* \*